United States Patent [19]  
Lacroix

[11] 4,158,113  
[45] Jun. 12, 1979

[54] LEVEL REGULATOR GOVERNED BY A PILOT TONE

[75] Inventor: Jean-Claude Lacroix, Longjumeau, France

[73] Assignee: Compagnie Industrielle des Telecommunications Cit-Alcatel, Paris, France

[21] Appl. No.: 920,896

[22] Filed: Jun. 29, 1978

[30] Foreign Application Priority Data

Jul. 21, 1977 [FR] France ................ 77 22353

[51] Int. Cl.² .......................................... H04B 3/12
[52] U.S. Cl. ................... 179/170 A; 330/52; 333/16
[58] Field of Search ............ 333/15, 16; 179/15 BP, 179/170 R, 170 A, 170 C, 170.4; 330/52, 130, 132; 325/2, 407, 411

[56] References Cited

U.S. PATENT DOCUMENTS 3,360,748 12/1967 Fish et al. ........................... 333/16
3,470,480 9/1969 Smart et al. ........................ 330/52
3,766,486 10/1973 Ouvrier ........................... 179/170 A Primary Examiner—Kathleen H. Claffy
Assistant Examiner—Randall P. Myers
Attorney, Agent, or Firm—Sughrue, Rothwell, Mion, Zinn and Macpeak

[57] ABSTRACT

The invention relates to transmission systems and in particular to level regulators controlled by a pilot tone and used in such systems to correct variations over a period of time in the attenuation of the transmission system.

The subject of the invention is a level regulator governed by a pilot tone whose gain control circuit locks in a mean position where there is a very low or zero value detected for the pilot tone. This locking is achieved by modifying the supply voltage of the error amplifier of the loop providing automatic gain control for the regulator.

The invention is of particular application to cable transmission systems with repeaters.

4 Claims, 5 Drawing Figures

LEVEL REGULATOR GOVERNED BY A PILOT TONE

The present invention relates to telecommunications. It concerns information transmission systems which use amplifiers to compensate for the attenuation of signals during transmission. It relates in particular to level regulators governed by a pilot tone and which are used to correct variations with time in the attenuaton of a transmission link.

The useful signal in a transmission link may be subject to variations in attenuation over a period of time. This is the case with cable transmission links for example, in which the cable attenuation varies with temperature. One method for correcting these variations is to provide on the link and/or at its ends one or more variable gain amplifiers or equalisers, referred to as level regulators, and whose gain is controlled as a function of the level of one or more pilot tones at stable amplitudes fed continuously into the link. The gain of these level regulators is controlled in such a way that the or each regulating pilot tone has a substantially constant output level irrespective of its input level.

When, as a result of a failure, the regulating pilot tones are no longer mixed into the useful signal, the gain of the level regulators tends to its maximum value with risks of saturating the circuit elements located downstream in the direction of transmission.

The present invention is intended to provide a level regulator governed by a pilot tone whose gain control system locks in a central position when very low values of the pilot tone level are detected.

The present invention provides a level regulator governed by a pilot tone comprising a variable gain quadripole through which there passes a signal whose amplitude is to be regulated and the pilot tone, the quadripole being provided with an automatic gain control loop formed by a bandpass filter isolating the pilot tone from the output signal of the quadripole, a detector amplifier measuring the level of the pilot tone at the output of the bandpass filter, and an error amplifier providing an indication of the difference between the detected level of the pilot tone and a reference level, the error amplifier acting on a circuit controlling the gain of the quadripole and comprising an amplification circuit with two differential inputs, one receiving the detected level of the pilot tone and the other receiving the reference level, an output terminal, and two direct current supply terminals, one positive, the other negative, one of which can go to zero potential, and a threshold detector receiving at its input the detected level of the pilot tone and providing a two-state output signal whose state depends on whether the detected level of the pilot tone is greater or less than the threshold, wherein the error amplifier also comprises a two-state bias circuit controlled by the threshold detector and connected into the supply circuit of the amplification circuit in series with the supply terminal whose polarity corresponds to that of the output signal of the amplification circuit when it is normally supplied and receives a zero detected level, said two-state bias circuit providing, under the control of the threshold detector, the bias for the supply terminal to which it is connected, the bias voltage when the detected level of the pilot tone is greater than the threshold of the threshold detector being the value required by the amplification circuit for normal operation, and the bias voltage when the detected level of the pilot tone is lower than the threshold of the threshold detector being a value closer to that of the bias of the other supply terminal, approximating to that required by the gain control circuit of the quadripole for the quadripole to have its mean gain.

Other characteristics and advantages of the invention will emerge from the attached claims and the description of two embodiments given hereinafter by way of example only. This description will be given by reference to the drawings, in which:

FIG. 1 shows the usual electrical diagram for a level regulator governed by a pilot tone as used in cable transmission links. It shows a variable gain quadripole (1) provided with an automatic gain control loop formed by a band pass filter (2) followed by a detector amplifier (3) and an error amplifier (4).

The input signal Ve whose level is to be regulated is applied to the input of the variable gain quadripole (1), which converts it into an output signal Vs. The signal Vs at the output of the variable gain quadripole (1) is applied to the band pass filter (2), which extracts from it the regulating pilot tone $F_1$. This is applied to the input of the detector amplifier (3) which gives an output voltage $e_D$ proportional to the detected level of the pilot tone $F_1$. The error amplifier compares with voltage $e_D$ with a reference voltage $e_R$ and gives an output voltage $V_g$ which is a function of the difference between them and which is used to control the gain of the quadripole (1). This gain is generally controlled by means of an indirectly heated thermistor whose variable resistance closes a Bode network located in a feedback circuit in the quadripole. It will not be described in detail as it is well known to those skilled in the art and does not form part of the present invention.

The variable gain quadripole (1) is made to act as a level regulator by causing its automatic gain control loop to function in such a way that its gain increases when the detected level of the pilot tone decreases and vice versa. With this method of operation, the quadripole achieves its maximum gain in the absence of any detectable level of the regulating pilot tone. This is to be avoided because of the risks of saturation of the elements of the link arranged downstream in the direction of transmission. In order to achieve this, it is necessary to prevent the output voltage of the error amplifier remaining at the limit of its variation range corresponding to a maximum gain for the quadripole when the voltage $e_d$ supplied by the detector amplifer (3) corresponds to the absence of any detectable level of the regulating pilot tone. This is achieved, according to the invention, by modifying the supply to the error amplifier in such a way that saturation effects bring its output voltage back to the centre of its variation range when the voltage $e_D$ supplied by the detector amplifier corresponds to the absence of a detectable level of the pilot tone.

Figure 2:
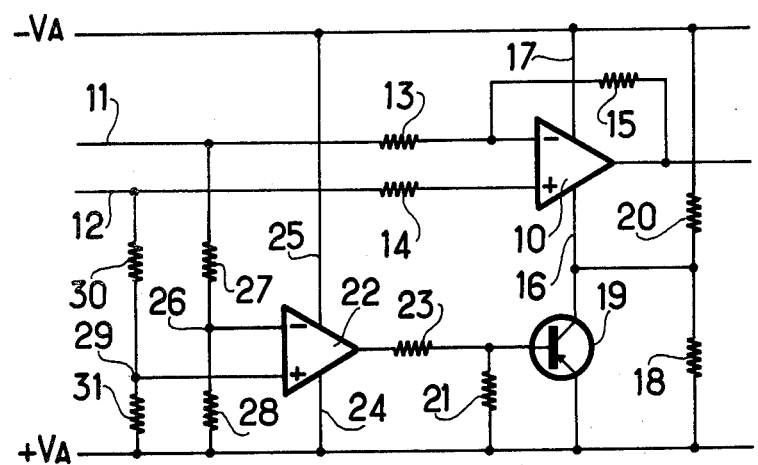
FIG. 2 shows an embodiment of the error amplifier of a level regulator governed by a pilot tone in accordance with the invention.

FIG. 2 is a diagram of an error amplifier according to the invention designed for a variable gain quadripole which for increased gain requires an increasing control voltage and vice versa.

Figure 1:
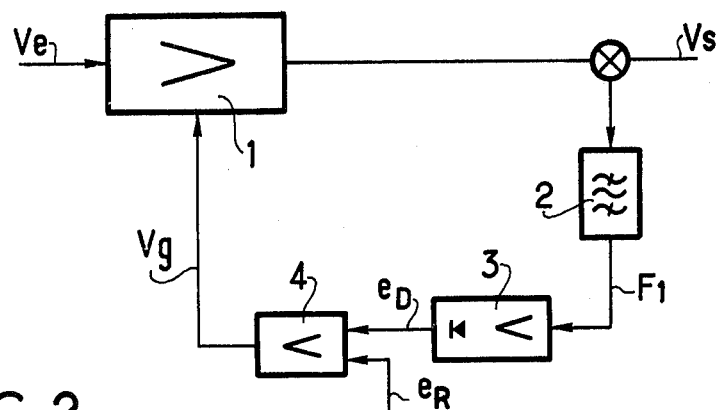
FIG. 1 is a block schematic of a level regulator governed by a pilot tone.

This error amplifier comprises an operational amplifier (10) having high gain, high input impedance, low output impedance, and differential inputs (11) and (12), one connected to the output of the detector amplifier (3, FIG. 1), the other to a reference voltage source. Resistances (13) and (14) inserted in the input circuits of the operational amplifier (10) and a resistance (15) in a feedback loop between its inverting input and its output permit the gain of the error amplifier to be adjusted so as to adapt the variation range of the signal $e_D$ supplied by the detector amplifier (3, FIG. 1) to the variation range of the gain control voltage required by the quadripole (1, FIG. 1). The operational amplifier (10) has two supply terminals, one positive (16), the other negative (17). In view of the above considerations, one should normally be at the potential $+V_A$ and the other at the potential $-V_A$. The negative supply terminal (17) is directly connected to a source of potential $-V_A$. The positive supply terminal (16) is connected to a source of potential $+V_A$ through a resistance (18) shunted across the emitter-collector junction of a transistor (19). It is also connected to the $-V_A$ supply junction by means of resistance (20) shunted across to supply terminals (16) and (17) and which constitutes a voltage divider with resistance to (18). This voltage divider fixes the polarity at the positive supply terminal (17) when the transistor (19) is cut off. The PNP transistor (19) has its emitter connected to the $+V_A$ supply, its collector connected to the positive supply terminal (16), and its base connected to the $+V_A$ supply by means of a resistance (21) and also to the output of an operational amplifier (22) by means of a resistance (23). The operational amplifier (22), which may be of the same type as the operational amplifier (10), has two supply terminals, a positive terminal (24) connected to the $+V_A$ supply and a negative terminal (25) connected to the $-V_A$ supply. It has two differential inputs, an inverting input (26) connected by means of a voltage divider comprising resistances (27), (28) between the inverting input (11) of the operational amplifier (10) and the $+V_A$ supply, and a non-inverting input (29) connected by means of a voltage divider comprising resistances (30), (31) between the non-inverting input (22) of the operational amplifier (10) and the $+V_A$ supply.

The transistor (19), the resistance (18) in parallel with the emitter-collector junction of the transistor (19), and the resistance (20) shunted across the supply terminals (16) and (17) of the operational amplifier (10), constitute a two-state bias circuit which enables the positive supply terminal (16) of the operational amplifier (10) to be brought either to the potential $+V_A$ when the transistor (19) is saturated, or to a lower potential $V_m$, determined by the values of the resistances (18) and (20), when the transistor (19) is cut off.

The operational amplifier (10), its input resistance (13) and (14) and its feedback resistance (15) constitute a linear amplifier when normally supplied, i.e. when the positive supply terminal (16) is at potential $+V_A$, and a saturated amplifier when under supplied, i.e. when the positive supply terminal (16) is at potential $V_m$.

The operational amplifier (22) constitutes a threshold detector. Its switchover threshold is determined by the values of the resistances (27), (28) and (30), (31) forming the voltage dividers connected to its inputs.

To explain the working of the above circuit in more detail, let it be assumed that the voltage $e_D$ supplied by the detector amplifier (3, FIG. 1) increases with the detected level of the pilot tone. This voltage $e_D$ is then applied to the inverting input (11) of the operational amplifier (10). The reference voltage $e_R$ is applied at the non-inverting input (12) of the operational amplifier (10), and is chosen in such a way as to centre the range of variation of the output voltage of the operational amplifier (10) at a value which regulates the gain of the variable gain quadripole to a mean value called the nominal value. The voltage $V_m$ determined by the values of the resistances (18) and (20) is chosen so as to be the same as the voltage which, when applied to the quadripole gain control circuit, regulates the gain of the quadripole to a value in the vicinity of the mean value. The voltage $e_{DS}$, which is the value of the output voltage of the detector amplifier (3, FIG. 1) at which the operational amplifier (22) switches over, is selected in the range of variation of the voltage $e_D$ for which the operational amplifier (10) would have an output voltage greater than the voltage $V_m$ if it were normally supplied. This range covers the low values of $e_D$.

Figure 3:
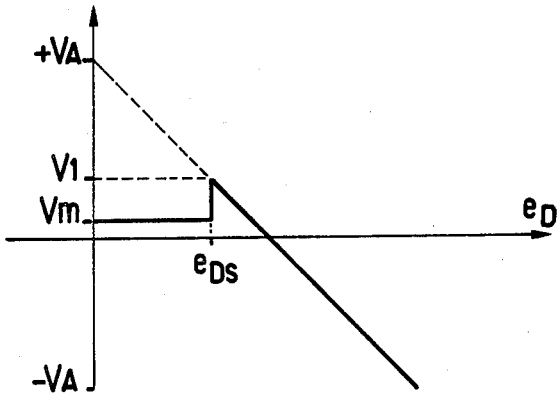
FIG. 3 is a curve showing how the output voltage of the error amplifier shown in FIG. 2 varies with variations of the input voltage.

FIG. 3 shows the output voltage of the operational amplifier (10) as a function of the voltage $e_D$ applied at its input when the above hypotheses in relation to the voltage $e_D$, $e_{DS}$, and $V_m$ are true.

When the voltage $e_D$ supplied by the detector amplifier (3, FIG. 1) increases from zero to the value $e_{DS}$, which corresponds to an abnormally low detected level of the pilot tone, the output of the operational amplifier (22) is at a potential close to $+V_A$; the transistor (19) is cut off and the positive supply terminal (16) of the operational amplifier (10) is brought to the potential $V_m$ by means of the voltage divider comprising resistances (18) and (20). The operational amplifier (10) is under-supplied and saturated. Its output voltage which, if normally supplied, would be greater than the potential $V_m$, is brought back to a value very close to $V_m$. As soon as the voltage $e_D$ supplied by the detector amplifier crosses the threshold $E_{DS}$, the operational amplifier (22) switches over, its output passing to a potential close to $-V_A$, which causes the transistor (19) to saturate and the positive supply terminal (16) of the operational amplifier (10) to be biased to $+V_A$. The amplifier is therefore normally supplied, and returns to an area of linear operation. Its output goes to a potential $V_1$ greater than $V_m$ and corresponding to the difference in potential across its inputs multiplied by the gain of the circuit. Its output voltage then decreases to $-V_A$ as the voltage $e_D$ supplied by the detector amplifier increases.

Where, contrary to the above hypothesis, the voltage $e_D$ supplied by the detector amplifier varies inversely to the detected level of the pilot tone, it is sufficient to reverse the roles of the inputs (11) and (12) of the operational amplifier (10).

Figure 4:
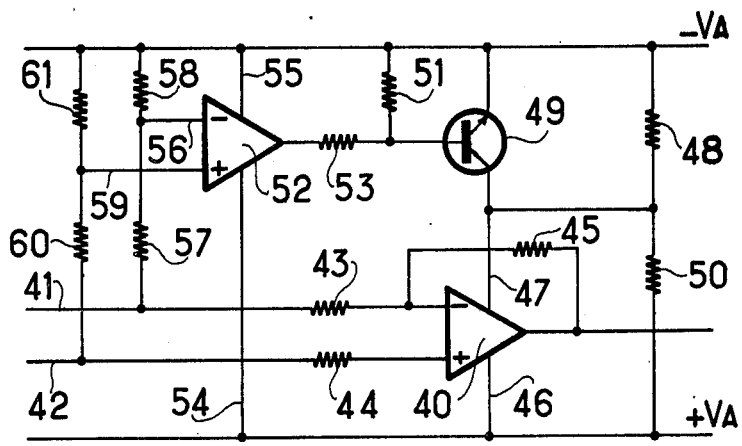
FIG. 4 shows another embodiment of the error amplifier of a level regulator governed by a pilot tone.

FIG. 4 is a diagram of a variant of the previous error amplifier for a situation in which the variable gain quadripole requires a decreasing voltage to increase its gain and vice versa.

The diagram shows an operational amplifier (40) having differential inputs (41) and (42) of which one is connected to the output of the detector amplifier (3, FIG. 1) and the other is connected to a reference voltage source. Resistances (43), (44) inserted in the input circuits of the operational amplifier (40) and a resistance

(45) in a feedback loop between its inverting input and its output enable the gain of the amplifier to be adjusted. The operational amplifier (40), has two supply terminals, a positive terminal (46) connected directly to a source of potential $+V_A$, and a negative terminal (47) connected to a source of negative potential $-V_A$ by means of a resistance (48) in parallel with the emitter-collector junction of a transistor (49). A resistance (50) is shunted across the positive and negative supply terminals (46) and (47). The NPN transistor (49) has its emitter connected to the $-V_A$ supply, its collector connected to the negative supply terminal (47) and its base connected to the $-V_A$ supply by a resistance (51) and also to the output of an operational amplifier (52) by a resistance (53). The operational amplifier (52) has two supply terminals, a positive terminal (54) connected to the $+V_A$ supply and a negative terminal (55) connected to the $-V_A$ supply. It has two differential inputs, an inverting input (56) connected by means of a voltage divider comprising resistances (57), (58) between the inverting input (41) of the operational amplifier (40) and the $-V_A$ supply, and a non-inverting input (59) connected by means of a voltage divider comprising resistances (60), (61) between the non-inverting input (42) of the operational amplifier (40) and the $-V_A$ supply.

As in the previous circuit, the operational amplifier (40), its input resistances (43) and (44) and its feedback resistance (45) constitute a linear amplifier when normally supplied and a saturated amplifier when under-supplied. However, its mode of operation is controlled by the bias at its negative supply terminal (47), instead of at its positive supply terminal (46). The transistor (49), the resistance (48) in parallel with the emitter-collector junction of the transistor (49), and the resistance (50) constitute the two-state bias circuit. The operational amplifier (52) constitutes the threshold detector.

Let it be assumed, as for the previous circuit, that the voltage $e_D$ supplied by the detector amplifier (3, FIG. 1) increases with the detected level of the pilot tone. This voltage is applied to the non-inverting input (42) of the operational amplifier (40). The reference voltage $e_R$ is applied at the inverting input (41) of the operational amplifier (40). It is selected so as to centre the range of variation of the output voltage of the operational amplifier (40) at a value corresponding to the nominal gain of the quadripole. The voltage $V_m$ determined by the voltage divider comprising resistances (48), (50) is chosen close to that which, when applied to the quadripole gain control circuit, produces the mean value of this gain. The voltage $e_{DS}$, which is the value of the voltage $e_D$ at which the operational amplifier (52) switches over, is selected within the range of variation of the voltage $e_D$ for which the operational amplifier (40) would have an output voltage lower than $V_m$ (in algebraic value) if it were normally supplied. In the present case, this range of variation covers the low values of $e_D$.

Figure 5:
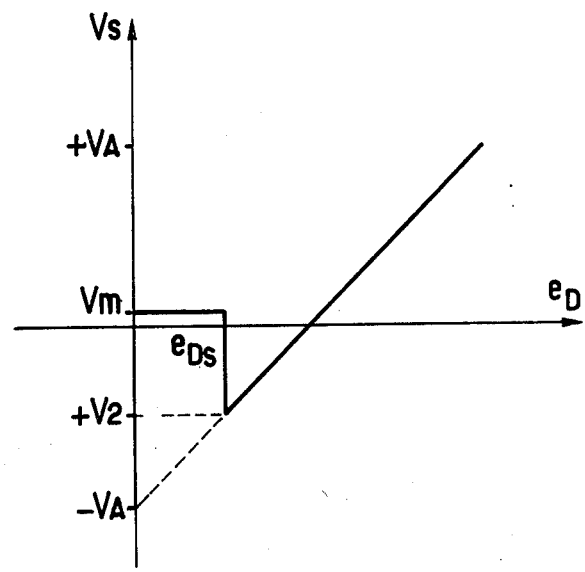
FIG. 5 is a curve showing how the output voltage of the error amplifier shown in FIG. 4 varies with variations in the input voltage.

FIG. 5 shows the output voltage of the operational amplifier (40) as function of the voltage $e_D$ applied at its input when the above hypotheses in relation to the voltages $e_D$, $e_{DS}$, and $V_m$ are true.

When the voltage $e_D$ increases from zero to the value $e_{DS}$, which corresponds to a zero or abnormally low detected level of the regulating pilot zone, the output of the operational amplifier (52) is at a potential close to $-V_A$, which cuts off transistor (49) and brings the negative supply terminal (47) of the operational amplifier (40) to the potential $V_m$ which, in the example chosen, is slightly positive. The operational amplifier (40) is under-supplied and saturated. Because of its saturated state its output voltage, which would be lower than $V_m$ if normally supplied, is brought back to a value close to $V_m$. As soon as the voltage $e_D$ reaches the threshold $e_{DS}$, the operational amplifier (52) switches over, and its output voltage changes to $+V_A$, which saturates the transistor (49) and biases the negative supply terminal (47) of the operational amplifier (40) to $-V_A$. As it is now normally supplied, the operational amplifier (40) returns to an area of liner operation, its output passing to a potential $V_2$ which is less than $V_m$. When the voltage $e_D$ again increases after having exceeded the threshold $e_{DS}$, the output voltage of the operational amplifier (40) increases in linear fashion from $V_2$ to $+V_A$.

Where the voltage $e_D$ supplied by the detector amplifier varies inversely to the detected level of the pilot tone, it is sufficient to reverse the roles of the inputs (41) and (42) of the operational amplifier (40).

The two circuits described above constitute a relatively simple means of providing level regulators governed by a pilot tone which behave normally when the detected level of the pilot tone is sufficient and which are set to their mean gain (rather than their maximum gain) in the absence of any detectable level of the pilot tone, which avoids problems of saturation where the disappearance of the pilot tone is not accompanied by the disappearance of the useful signal.

Without departing from the scope of the present invention, certain arrangements may be modified or certain means may be replaced by equivalent means. In particular, in the circuits shown in FIG. 2 and 4 it is possible to replace the resistance shunted across the emitter-collector junction of the transistor by a different type of impedance, and to eliminate the resistances in series with the latter between the $+V_A$ and $-V_A$ supplies.

I claim:

1. A level regulator governed by a pilot tone comprising a variable gain quadripole through which there passes a signal whose amplitude is to be regulated and the pilot tone, the quadripole being provided with an automatic gain control loop formed by a bandpass filter isolating the pilot tone from the output signal of the quadripole, a detector amplifier measuring the level of the pilot tone at the output of the bandpass filter, and an error amplifier providing an indication of the difference between the detected level of the pilot tone and a reference level, the error amplifier acting on a circuit controlling the gain of the quadripole and comprising an amplification circuit with two differential inputs, one receiving the detected level of the pilot tone and the other receiving the reference level, an output terminal, and two direct current supply terminals, one positive, the other negative, one of which can go to zero potential, and a threshold detector receiving at its input the detected level of the pilot tone and providing a two-state output signal whose state depends on whether the detected level of the pilot tone is greater or less than the threshold, wherein the error amplifier also comprises a two-state bias circuit controlled by the threshold detector and connected into the supply circuit of the amplification circuit in series with the supply terminal whose polarity corresponds to that of the output signal of the amplification circuit when it is normally supplied and receives a zero detected level, said two-state bias circuit providing, under the control of the threshold detector, the bias for the supply terminal to which it is connected, the bias voltage when the detected level of the pilot tone is greater than the threshold of the threshold detector being the value required by the amplification circuit for normal operation, and the bias voltage when the detected level of the pilot tone is lower than the threshold of the threshold detector being a value closer to that of the bias of the other supply terminal, approximating that required by the gain control circuit of the quadripole for the quadripole to have its mean gain.

2. A regulator according to claim 1, wherein the two-state bias circuit includes an impedance connected into the supply circuit of the amplification circuit in series with a supply terminal, and a semi-conductor switch controlled by the threshold detector and arranged in parallel with same inpedance, the amplication circuit being supplied normally when the switch is closed and under-supplied when the switch is open.

3. A regulator according to claim 1, wherein the two-state bias circuit includes a first resistance connected into the supply circuit of the amplification circuit in series with a supply terminal, a second resistance in parallel with the positive and negative supply terminals and forming with the first resistance a voltage divider resistance and controlled by the threshold detector.

4. A regulator according to claim 1, wherein the threshold detector consists of a comparator whose inputs are connected in parallel with those of the amplification circuit by means of resistive attenuators.

* * * * *